United States Patent [19]

Hall et al.

[11] Patent Number: 5,458,439
[45] Date of Patent: Oct. 17, 1995

[54] PIPE ATTACHMENT AND RECEIVING ASSEMBLY

[75] Inventors: N. Victor Hall, Houston, Tex.; Peter Rash, Victoria, Australia

[73] Assignee: Sonsub International Management Inc., Houston, Tex.

[21] Appl. No.: 55,207

[22] Filed: Apr. 29, 1993

[51] Int. Cl.[6] .................................................. F16L 1/26
[52] U.S. Cl. ............................ 405/158; 405/169; 405/188
[58] Field of Search ................................. 405/154, 156, 405/158, 169, 170, 188

[56] References Cited

U.S. PATENT DOCUMENTS

| | | | |
|---|---|---|---|
| 3,267,682 | 8/1966 | Robley | 405/170 |
| 3,578,233 | 5/1971 | Meister et al. | 228/5 |
| 3,603,617 | 9/1971 | Lochridge | 285/24 |
| 3,972,554 | 8/1976 | Tryon | 294/97 |
| 4,109,480 | 8/1978 | Sumner | 61/114 |
| 4,218,158 | 8/1980 | Tesson | 405/170 |
| 4,229,120 | 10/1980 | Wallace et al. | 405/158 |
| 4,234,268 | 11/1980 | Scodino | 405/158 |
| 4,252,466 | 2/1981 | Berti et al. | 405/172 |
| 4,253,779 | 3/1981 | Grognu | 405/169 |
| 4,268,190 | 5/1981 | Tesson | 405/169 |
| 4,443,129 | 4/1984 | Sivry et al. | 405/170 |
| 4,444,528 | 4/1984 | Scodino et al. | 405/173 |
| 4,445,804 | 5/1984 | Abdallah et al. | 405/173 |
| 4,832,530 | 5/1989 | Andersen et al. | 405/170 |
| 5,044,827 | 9/1991 | Gray et al. | 405/173 |

OTHER PUBLICATIONS

Sonsub International Management Inc. compilation of various pieces of prior art pipe attachment and receiving assembly equipment included in report entitled "Design Study Diverless Pipeline Repair System Report for Saipem," Nov. 8, 1991, 18 pages.
Sonsub International Management, Inc. compilation of Sonsub conceptual drawings of pipe attachment and receiving assembly equipment included in report entitled "Design Study Diverless Pipeline Repair System Report for Saipem," Nov. 8, 1991, 13 pages.
N. V. Hall and Mauro Brambilla, Deepwater Pipeline Repair Utilizing Advanced Remotely Operated Worksystems, 1993, 17 pages.

*Primary Examiner*—David H. Corbin
*Attorney, Agent, or Firm*—Pravel, Hewitt, Kimball & Krieger

[57] ABSTRACT

A pipe attachment and receiving apparatus for severing and handling a subsea pipe. The apparatus including a chassis adapted to mount onto a subsea pipe and clamps for clamping the chassis to the subsea pipe. An interface assembly is connected to the chassis. The interface assembly is adapted to extend and retract relative to the chassis. The interface assembly is adapted to receive modules. The modules are adapted to be releasably mounted to the interface assembly. A cutting module is mounted to the interface assembly to cut the pipeline and a docking module is mounted to the interface assembly to repair the pipeline with a replacement spool.

15 Claims, 6 Drawing Sheets

PIPE ATTACHMENT AND RECEIVING ASSEMBLY

BACKGROUND OF THE INVENTION

1. Field of the Invention

The present invention relates to a subsea pipe attachment and receiving assembly for use in subsea pipeline repairs.

2. Description of the Prior Art

There are thousands of miles of pipelines laying on the seabed. Pipe laying technology permits pipelines to be laid in extremely shallow water depths to water depths of thousands of feet. A serious problem results when a subsea pipeline in deep water is damaged and in need of repair. A few examples of how a subsea pipeline can be damaged are by an object impacting the pipeline, an anchor dragging across the pipeline, or corrosion.

Typically, to repair a damaged submerged pipeline in the past, a couple of repair methods were available. One repair method required the damaged section of the pipeline to be recovered to the water surface and the necessary repairs were conducted on the deck of a vessel. After the repair was made the pipeline was lowered and repositioned on the seabed. This method was generally limited to small diameter pipelines in relatively shallow water. A second method involved conducting the repair in situ by divers, using either repair clamps or hyperbaric welding techniques. This method had also limitations related to water depth and pipeline size.

It is known to use a remotely operated vehicle (ROV) in deep water to sever and recover a submerged pipeline. U.S. Pat. No. 5,044,827 to Gray et al. discloses a method for severing and recovering a submerged pipeline. The ROV jets beneath a portion of the pipeline and then a deflated lift bag is lowered to the submerged pipeline. The deflated lift bag is positioned under the submerged pipeline and then inflated until a section of the pipeline has been raised off of the seabed. A cut-off saw is lowered to the raised section of the pipeline. The cut-off saw is clamped to the pipeline prior to severing the pipeline. The cut-off saw is then removed from the severed pipeline. A recovery head is lowered to the raised end of the severed pipeline and after alignment is placed in the raised end of the severed pipeline. The recovery head is activated to establish a gripping relationship with the pipeline. A recovery cable is lowered and connected to the recovery head. The recovery cable is retrieved to recover the recovery head and the pipeline to the water surface.

As the offshore pipeline industry continues to venture into deeper and deeper waters, more and more pipelines of increasing diameter are being laid in water depths beyond the range of divers. Due to a variety of factors such as pipeline size, seabed bearing capacity, sea currents, and lay barge daily rates, a reliable and dependable method for repairing submerged pipelines without retrieval to the water surface is needed. The method should minimize the amount of handling of the damaged pipeline. Furthermore, the method of repairing the pipeline should minimize costs and dependency on vessel motions due to sea conditions, such as heave, roll, or pitch, which can result in a significant amount of standby time and cost.

It is desirable to have a subsea pipe attachment and receiving assembly for use in subsea pipeline repairs which can sever a pipeline at a nominal distance above the seabed to allow the damaged section of pipeline to be removed. It is further desirable to have a subsea pipe attachment and receiving assembly which aligns and manipulates a replacement spool to be installed between the severed ends of the subsea pipeline. Furthermore, the subsea pipe attachment and receiving assembly should be operable with the use of an ROV.

SUMMARY OF THE PRESENT INVENTION

The present invention is a pipe attachment and receiving assembly having modular components to perform subsea pipe severing and handling operations in subsea pipeline repairs. The present invention includes a cutting module assembly which can sever a pipeline at a nominal distance above the seabed and further includes a docking module to align and manipulate a replacement spool to be installed between the severed ends of the subsea pipeline.

The pipe attachment and receiving assembly includes a chassis assembly having a first and second pair of leg assemblies adapted to straddle the subsea pipe. The chassis assembly includes a pair of arms pivotally mounted to each leg assembly. Each arm is adapted to grippingly engage the subsea pipeline. Movement of the arms is controlled by hydraulic cylinders.

The pipe attachment and receiving assembly includes an interface assembly which can extend and retract relative to the chassis. The interface assembly includes guide funnels and collet connectors to releasably mount the modules thereto.

The cutting module assembly is adapted to be mounted to the interface assembly. The cutting module assembly includes a cutting module plate with docking probes and collet pins attached thereto for mounting to the interface assembly. A cutting head is rotatably mounted to the cutting module plate to perform the cut of the pipeline.

The docking module assembly is adapted to be mounted to the interface assembly in the same manner as the cutting module assembly. The docking module assembly includes a docking module plate and a plurality of upright docking posts attached thereto.

BRIEF DESCRIPTION OF THE DRAWINGS

The objects, advantages, and features of the invention will become more apparent by reference to the drawings which are appended hereto and wherein like numerals indicate like parts and wherein an illustrated embodiment of the invention is shown, in which.

DETAILED DESCRIPTION OF THE INVENTION

The pipe attachment and receiving (PAR) assembly for subsea pipe severing and handling, designated generally as 100, includes a chassis assembly 30 as shown in FIGS. 1, 2, 3, and 4.

Figure 1:
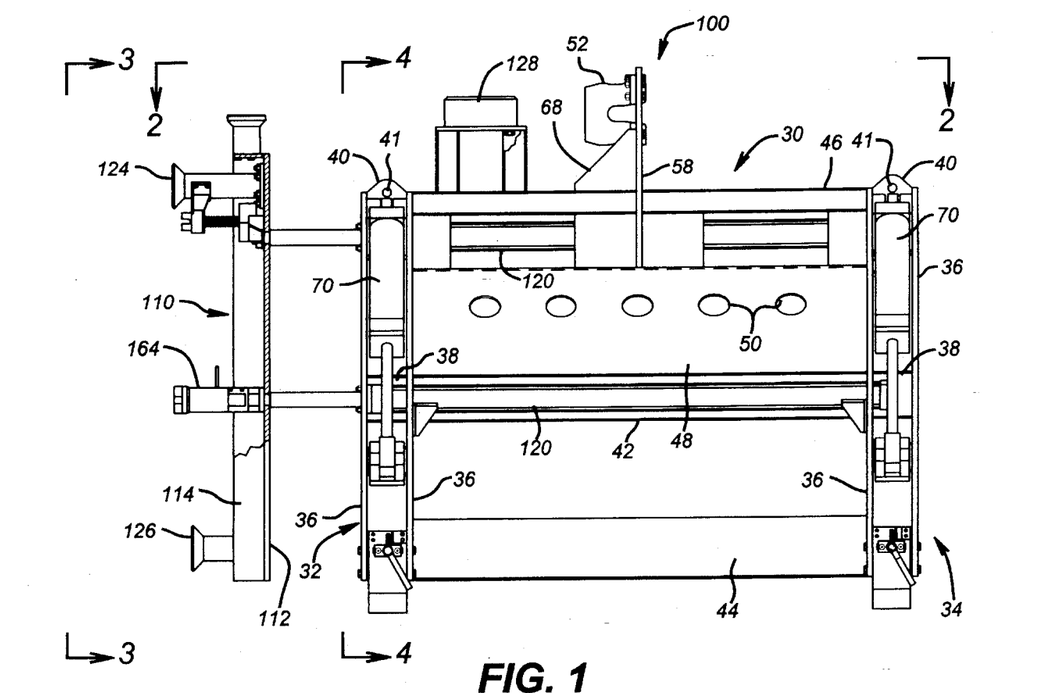
FIG. 1 is a side elevational view of the chassis assembly of the pipe attachment and receiving assembly according to the present invention.
Figure 2:
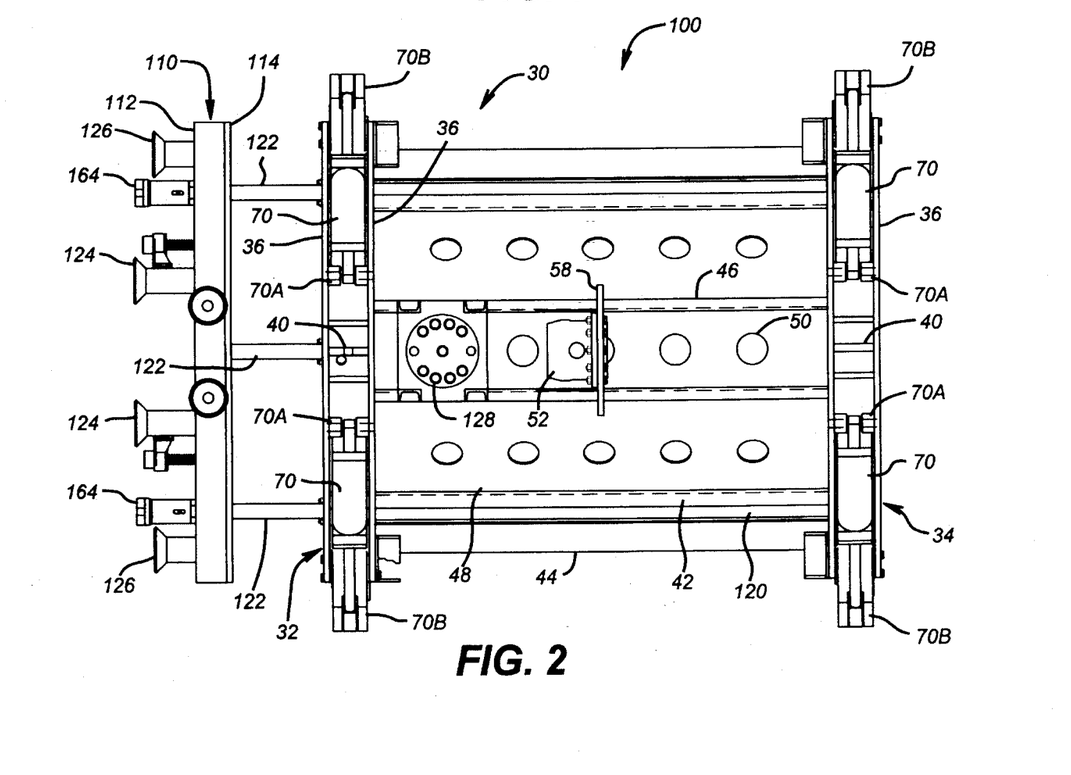
FIG. 2 is a view taken along line 2—2 of FIG. 1.
Figure 4:
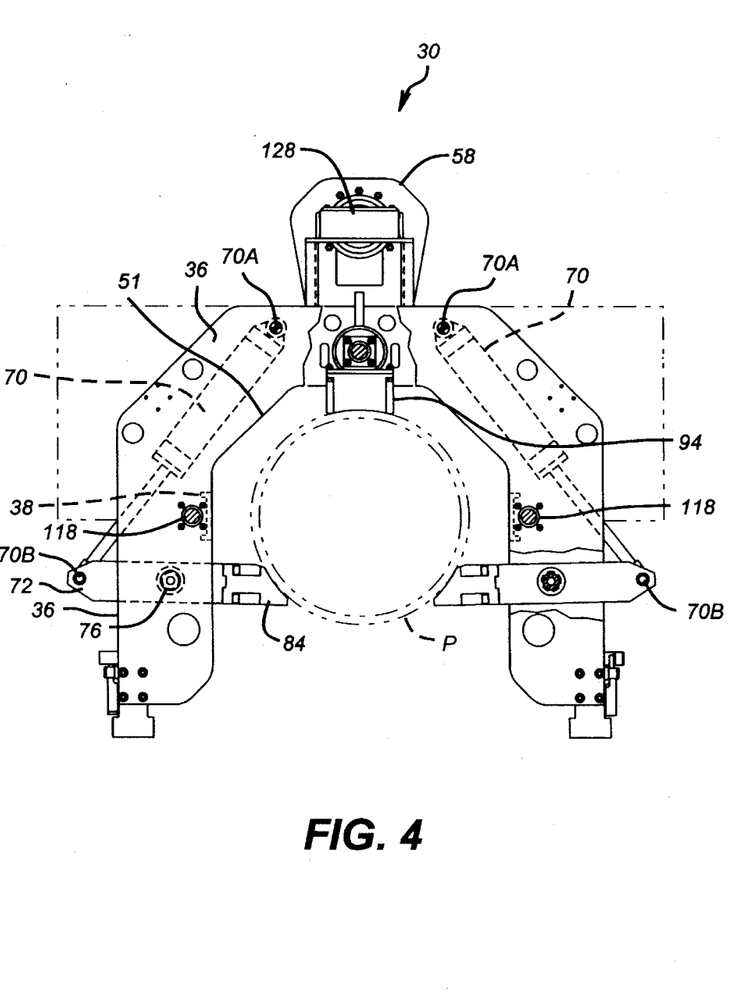
FIG. 4 is a view taken along line 4—4 of FIG. 1.

Referring to FIGS. 1 and 2, the chassis assembly 30 includes a first and second pair of leg assemblies, 32 and 34 respectively. Each of the leg assemblies 32 and 34 include a pair of u-shaped plates 36 as shown in FIG. 4. Each pair of u-shaped plates 36 is maintained a fixed distance from each other by a pair of short channel sections 38 medially positioned between the pair of u-shaped plates 36 and an upper spacer plate 40. The upper spacer plate 40 includes a lifting eye 41.

Referring to FIGS. 1 and 2, the first and second pair of leg assemblies, 32 and 34 respectively, are secured to each other with a pair of channel members 42 medially positioned and with a pair of chassis plates 44 positioned between opposing lower ends of the leg assemblies 32 and 34. A pair of upper channels 46 are positioned between opposing upper ends of the leg assemblies 32 and 34. A shield plate 48 having a plurality of openings 50 extends between the leg assemblies 32 and 34 along the inner periphery 51 (FIG. 4) of the u-shaped plates 36 between the pair of medially positioned channel members 42. The plurality of openings 50 in the shield plate 48 permit water to pass through as the assembly 100 is being raised from and lowered to the seabed.

Figure 5:
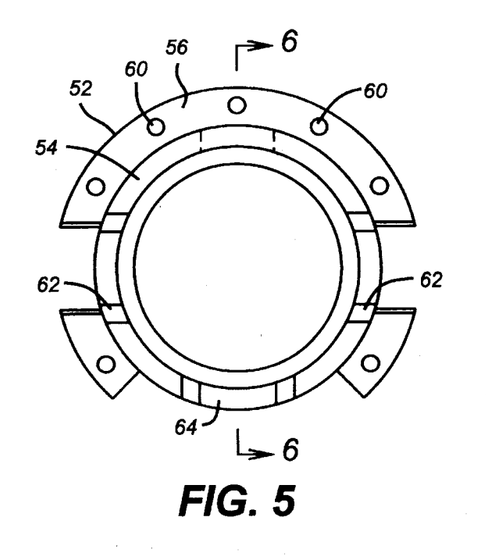
FIG. 5 is an end elevational view of a docking probe receiver.
Figure 6:
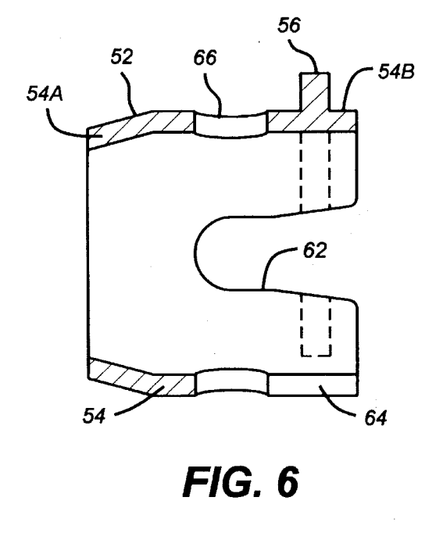
FIG. 6 is a view taken along line 6—6 of FIG. 5.
Figure 7:
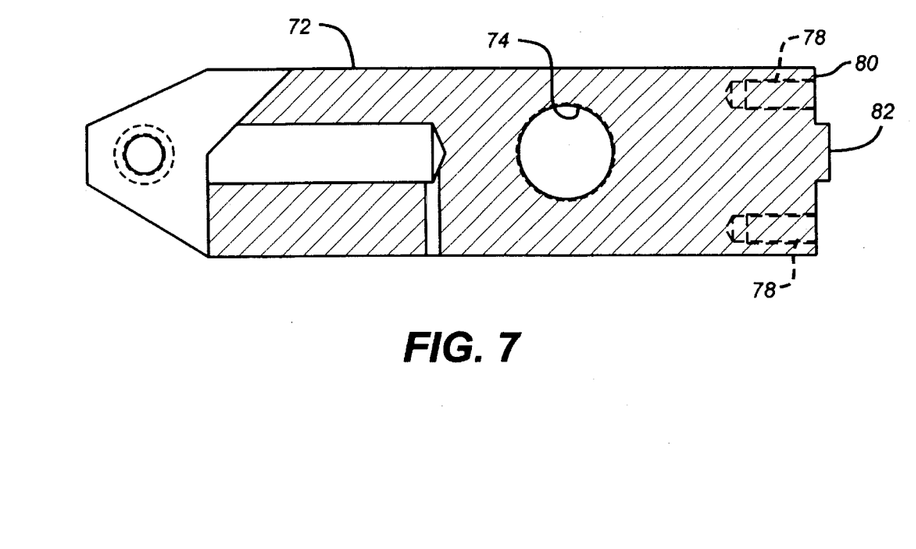
FIG. 7 is an elevation sectional view of a clamp arm.
Figure 8:
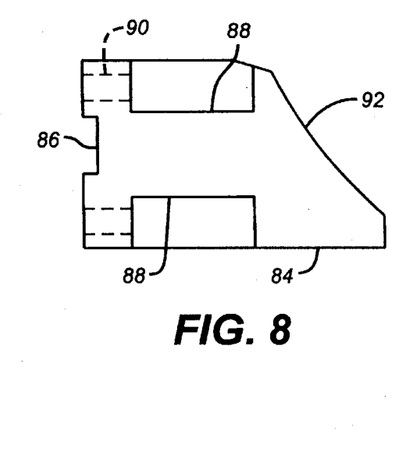
FIG. 8 is an elevational view of a pipe pad.

Referring to FIGS. 1 and 2, a docking probe receiver 52 is located substantially midway between the leg assemblies 32 and 34. The docking probe receiver 52 is shown in detail in FIGS. 5 and 6. The docking probe receiver 52 includes a tubular housing 54 having an inwardly tapering first end 54A and a generally peripheral flange 56 with a plurality of holes 60 for bolting the receiver 52 to a receiver plate 58 (FIGS. 1 and 2) at a second end 54B. The receiver plate 58 is secured to the pair of upper channel members 46 and to the shield plate 48. The receiver plate 58 includes an opening (not shown) which permits the second end 54B of the tubular housing 54 to extend therethrough when bolted to the receiver plate 58. The tubular housing 54 includes a pair of opposing slots 62 having a slight outward taper. The tubular housing 54 further includes a third slot 64 positioned substantially midway between the pair of opposing slots 62. Opposite the inner end of the third slot 64 is a hole 66. A pair of gusset plates 68 are welded to the receiver plate 58 and to the upper channel members 46 to provide increased resistance to bending.

Referring to FIGS. 1 and 2, positioned forward of the docking probe receiver 52 is a hydraulic stab and interfacing assembly 128. The hydraulic stab and interfacing assembly 128 is adapted to interconnect with hydraulic power supplied by a remotely operated vehicle (ROV) to operate various components as will be described below.

Referring to FIGS. 3, 4, 7 and 8, the chassis assembly 30 further includes apparatus for clamping the chassis assembly 30 to the pipeline. Referring to FIG. 4, the clamping apparatus includes a pair of hydraulic cylinders 70 which are pin-connected to the u-shaped plates 36 at a housing end 70A and pin-connected to a clamp arm 72 at a ram end 70B of the hydraulic cylinders 70. Each clamp arm 72 includes a pivot bore 74 (FIG. 7) which receives a pivot pin 76 extending through the pair of u-shaped plates 36 as shown in FIG. 4. Opposite the pin-connected end of the clamp arm 72 is a plurality of threaded bores 78 recessed in an endface 80 of the clamp arm 72. The endface 80 includes a protruding section 82 corresponding to a recessed section 86 of a pipe pad 84. The pipe pad 84 includes a plurality of notched cutouts 88. A plurality of bores 90 extend from the end of the pipe pad 84 to the notched cutouts 88. The bores 90 align with the threaded bores 78 of the clamp arm 72. The pipe pad 84 is attached to the clamp arm 72 by inserting a threaded fastener (not shown) into each notched cutout 88 and through the bore 90 before threadably engaging the threaded bore 78 of the clamp arm 72. The pipe pad 84 includes an arcuate surface 92 corresponding to the radius of the outer layer of the pipeline to be clamped thereto.

It is to be understood that the clamping assembly described above can be adapted to accommodate pipelines of various diameters by bolting the appropriate pipe pads 84 to the clamp arms 72. Sets of pipe pads 84 can be provided in which the length of the pipe pads 84 and the radius of curvature correspond to various pipeline diameters.

Figure 3:
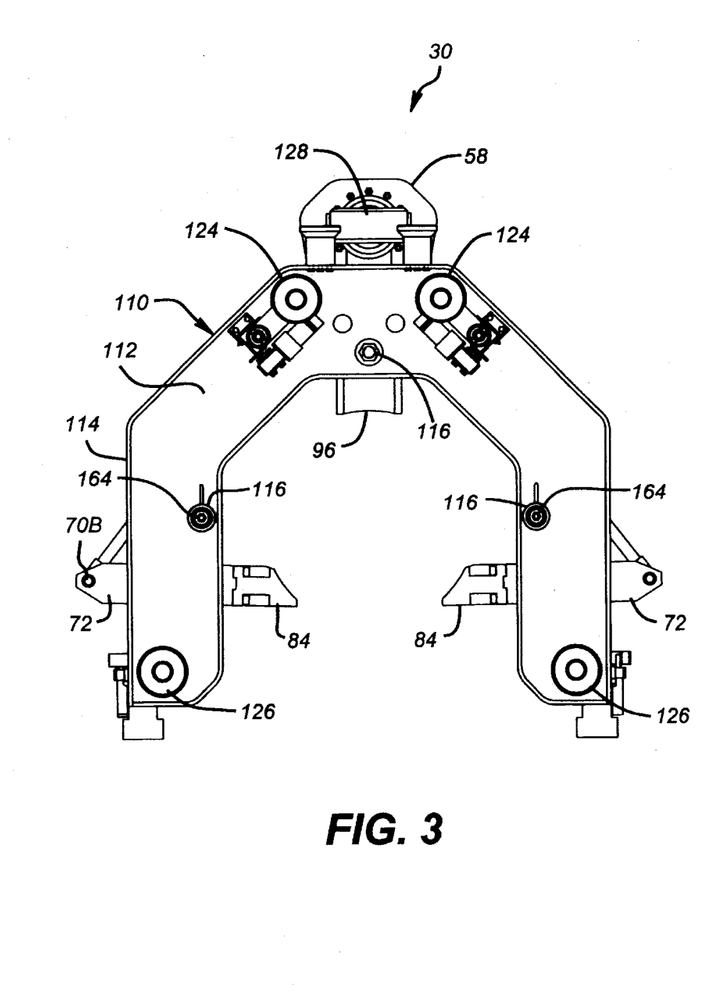
FIG. 3 is a view taken along line 3—3 of FIG. 1.

As shown in FIGS. 3 and 4, a top clamping pad 94 is attached to the chassis assembly 30. in FIG. 3, the top clamping pad 94 includes a lower curved surface 96 corresponding to the curvature of the outer layer of the pipeline which is to be clamped thereto.

Referring now to FIGS. 1, 2, and 3, the chassis assembly 30 includes an interface assembly 110. The interface assembly 110 includes an interface plate 112 which is generally u-shaped. The interface plate 112 has a flat bar 114 welded around the perimeter of the interface plate 112. The interface plate 112 further includes three openings 116 (FIG. 3) positioned around the u-shaped opening. The three openings 116 are aligned with corresponding openings 118 (FIG. 4) in the leg assemblies 32 and 34. Three hydraulic cylinders 120 are mounted between the leg assemblies 32 and 34 with gusset plates and bolted to the leg assemblies 32 and 34. The cylinder rams 122 extend forward of the leg assembly 32 to the interface plate 112 and are attached thereto. The three hydraulic cylinders 120 are operated synchronously for reasons which will be explained below.

Referring to FIGS. 1, 2, and 3, the interface plate 112 includes a pair of upper funnels 124 and a pair of lower funnels 126. The upper and lower funnels 124 and 126 are secured to the interface plate 112, preferably with threaded fasteners (not shown). As shown in FIG. 1, the upper funnels 126 are longer than the lower funnels 124 in the preferred embodiment. The purpose of the differing lengths is to facilitate the subsea stabbing of components having a plurality of guide probes onto the interface assembly 110 as will be described below.

Figure 9:
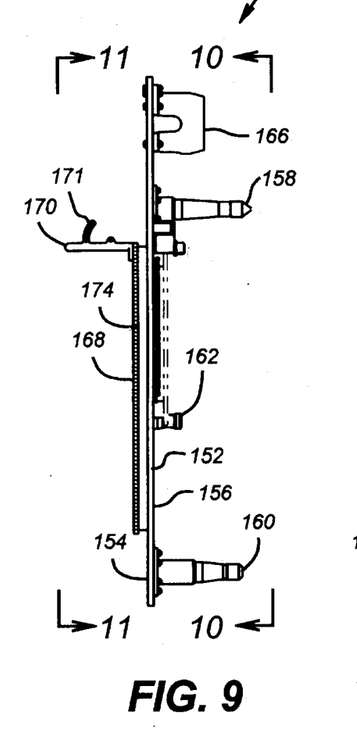
FIG. 9 is a side elevational view of a cutting module assembly.
Figure 10:
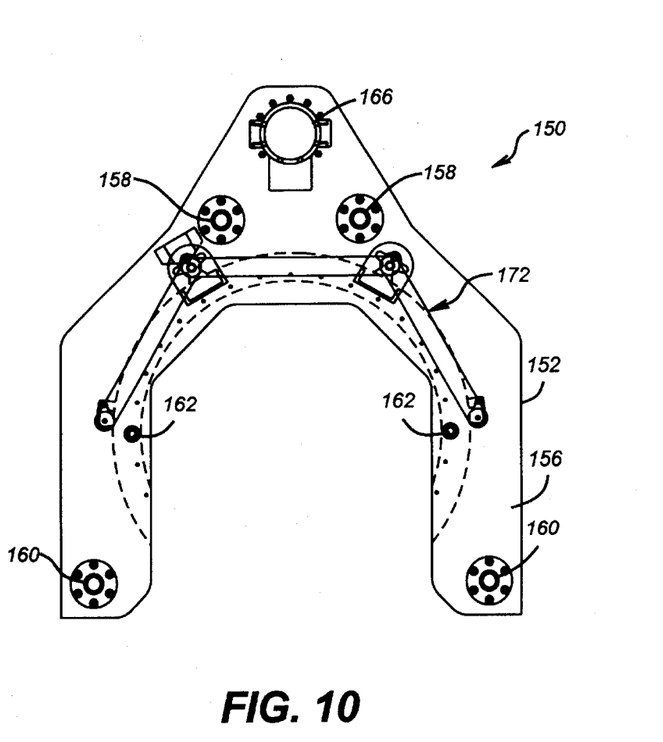
FIG. 10 is a view taken along line 10—10 of FIG. 9.
Figure 11:
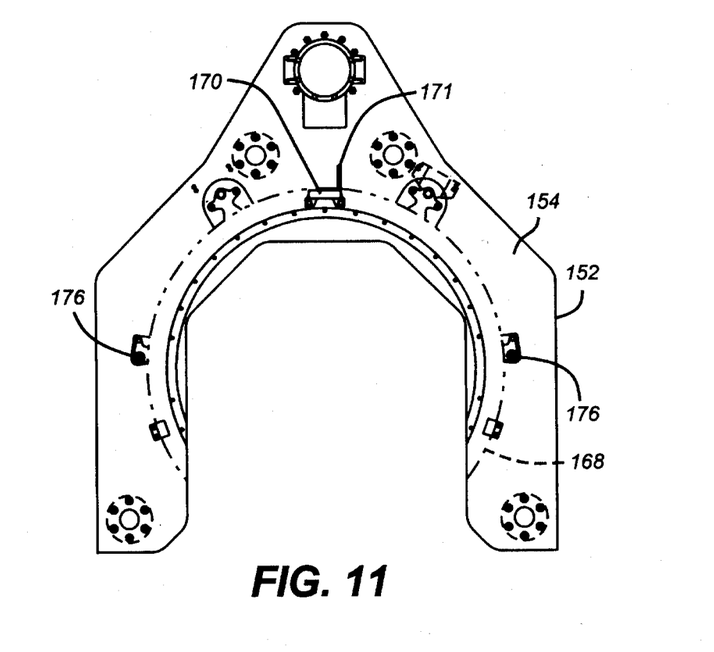
FIG. 11 is a view taken along line 11—11 of FIG. 9.

One component adapted to be stabbed onto the interface assembly 110 of the pipemate assembly 100 is a cutting module assembly, designated generally as 150, as shown in FIGS. 9, 10 and 11. The cutting module assembly 150 includes a generally u-shaped cutting module plate 152. The cutting module plate 152 includes a first surface 154 and a second surface 156. Referring to FIGS. 9 and 10, the second surface 156 of the cutting module plate 152 includes a pair of upper guide probes 158 and a pair of lower guide probes 160. The upper guide probes 158 are aligned with the upper funnels 124 on the interface plate 112 of the PAR assembly 100. The lower guide probes 160 are aligned with the lower funnels 126 on the interface plate 112 of the PAR assembly 100.

Still referring to FIGS. 9 and 10, the second surface 156 of the cutting module plate 152 includes a pair of collet pins 162 which are aligned with a pair of collet connectors 164 (FIGS. 1, 2, and 3) attached to the interface plate 112. The collet connectors 164 are adapted to receive the collet pins 162. The collet connectors 164 engage the collet pins 162 by exerting a small forward pressure.

Referring to FIGS. 9 and 10, a female docking probe receiver 166 is connected to the upper portion of the second surface 156 of the cutting module plate 152. The docking probe receiver 166 is similar to the docking probe receiver 52 of the PAR chassis 30 which has been described above and is shown in detail in FIGS. 5 and 6. The docking probe receivers 52 and 166 receive a male docking probe mounted to the ROV which permits the ROV to swim about and transport the component.

Referring to FIGS. 9 and 11, the first surface 154 of the cutting module plate 152 includes a rotatably mounted driven wheel 168. The driven wheel 168 is circular but does not extend 360°. As best shown in FIG. 11, the driven wheel 168 has a section removed substantially equal to section between the legs of the cutting module plate 152. The removed section of the driven wheel 168 permits the cutting module assembly 150 to be lowered onto the pipeline to be cut. A cutting nozzle bracket 170 is attached to the driven wheel 168, preferably at a location substantially 180° from the removed section. A cutting nozzle 171 is attached to the cutting nozzle bracket 170. Referring to FIG. 10, a drive assembly, designated generally as 172, is mounted to the second surface 156 of the cutting module plate 152. The driven wheel 168 includes a plurality of peripheral teeth 174 which engage a plurality of drive gears 176 mounted to the first surface 154 of the cutting module plate 152. The drive gears 176 are driven by drive assembly 172. Thus, the drive assembly 172 rotates the driven wheel 168 with the mounted cutting nozzle 171 a complete 360° revolution around the pipe being cut. In the preferred embodiment, the cutting is performed with an abrasive jet cutting tool.

Figure 12:
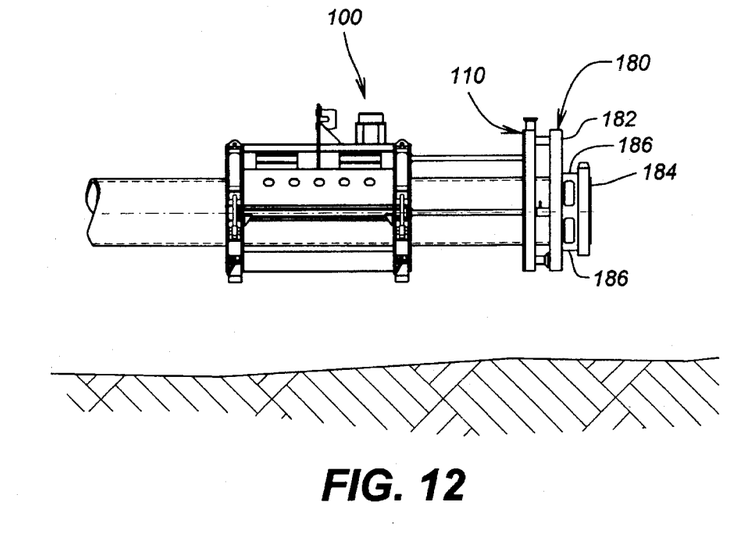
FIG. 12 is a side elevational view of the pipe attachment and receiving assembly with the docking module assembly installed on the pipeline.

A second component adapted to be stabbed onto the interface assembly 110 of the PAR assembly 100 is a docking module assembly, designated generally as 180, as shown in FIG. 12. The docking module assembly 180 includes a generally u-shaped docking module plate (not shown) similar in shape to the cutting module plate 152. It is to be understood that the docking module assembly 180 includes all of the identical pairs of upper and lower guide probes 158 and 160, and a pair of collet pins 162 as described above for the cutting module assembly 150. Referring to FIG. 12, the docking module assembly 180 also includes a flat bar 182 welded substantially around the perimeter of the docking module plate to provide added resistance to bending. Additional plate stiffeners (not shown) may be welded to the docking module plate if added strength is desired.

Figure 13:
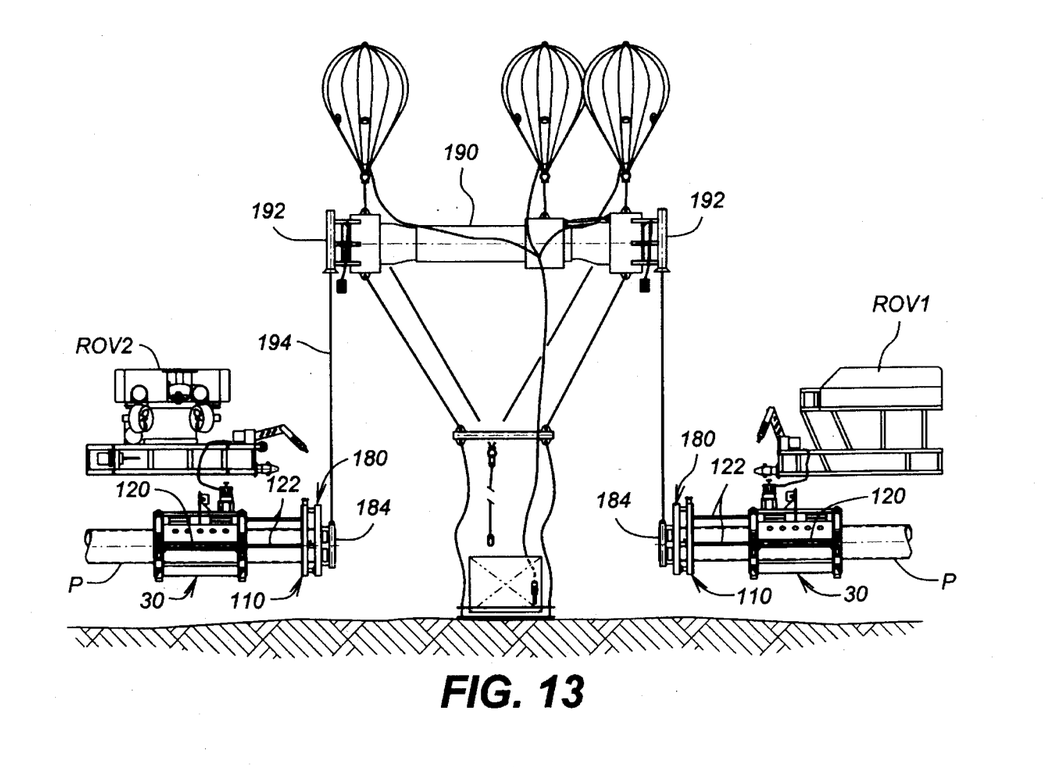
FIG. 13 is a side elevational view of the rigging for hauling the replacement spool on the docking modules.

Referring to FIGS. 12 and 13, the docking module assembly 180 includes a pair of docking posts 184 which are attached to the docking module plate with mounting brackets 186. The docking posts 184 are adapted to be received in a corresponding pair of slit guide funnels 192 of a replacement spool 190.

OPERATION OF THE INVENTION

The operation of the present invention is described in detail in copending application entitled "METHOD FOR REPAIRING A SUBMERGED PIPELINE" filed concurrently herewith. Applicants hereby incorporate by reference copending application entitled "METHOD FOR REPAIRING A SUBMERGED PIPELINE" filed concurrently herewith.

The PAR assemblies 100 are intended to be installed onto a damaged pipeline with the assistance of the ROV. With the PAR assembly 100 at the seabed, the ROV engages it. The ROV swims to the pipeline P and positions the PAR assembly 60 astride the pipeline P. After the location of the PAR assembly 100 has been confirmed, the ROV powers the hydraulic cylinders 70 on the PAR assembly 100 to firmly grip the pipeline P. A visual check is performed using the ROV to ensure that the clamp arms 72 have closed and that the PAR assembly 100 is still aligned to the pipeline P. The steps are repeated for installing the second PAR assembly 100 at the other end of the damaged section of pipeline P.

The first ROV, designated as ROV1, swims to a module stowage rack (not shown) and engages the cutting module assembly 150. After ROV1 swims to the PAR assembly 100, a second ROV, designated as ROV2, moves into position to provide visual observation of the alignment. ROV1 swims forward and engages the upper and lower guide probes 158 and 160 (FIG. 9) in the upper and lower funnels 124 and 126. The collet pins 162 (FIG. 9) are locked to the collet connectors 164 (FIG. 1) while asserting a small forward pressure. A small amount of back thrust is applied by ROV1 to confirm that the collet connectors 164 are locked. ROV1 disengages and ROV2 swims back to the module stowage rack R for the next cutting module C and dock on to the other PAR assembly 100. The same steps are repeated.

A cutting hose whip (not shown) is stabbed into the cutting module assembly 150 and locked into place. ROV1 connects to the hydraulic stab and interfacing assembly 128. ROV2 gets in position to observe the cut of the pipeline P. The PAR stroking cylinders 120 (FIG. 1) are extended by ROV1 until the cutting module assembly 150 is at the correct location. The cutting is then performed on the pipeline P with the cutting nozzle 171. The cutting nozzle is rotated 360° around the pipe P by the hydraulic power from ROV1 which powers the drive assembly 172. ROV2 visually confirms that the pipe is cut. The PAR stroking cylinders 120 are then retracted approximately 100 millimeters and the pipeline P is cut a second time. The PAR stroking cylinders 120 are then retracted until they are in the fully closed position. The same technique is used for making a third cut at the other PAR assembly 100. After the pipeline has been cut the cutting module assemblies 150 are removed from the interface assembly 110.

The docking module assemblies 180 are installed onto the interface assembly 110 in the same manner as the cutting module assemblies 150.

Figure 14:
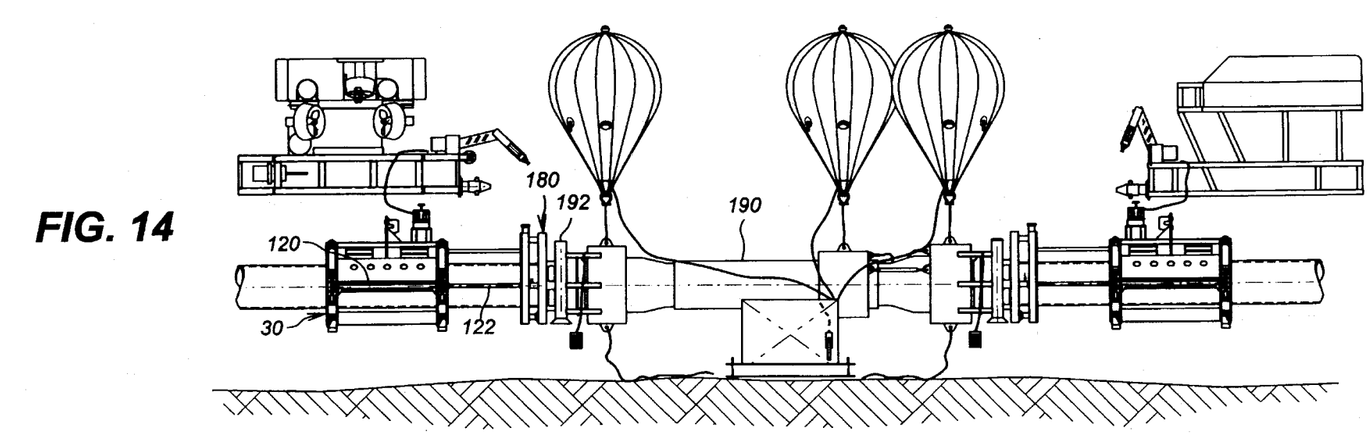
FIG. 14 is a side elevational view of the replacement spool on the docking modules.
Figure 15:
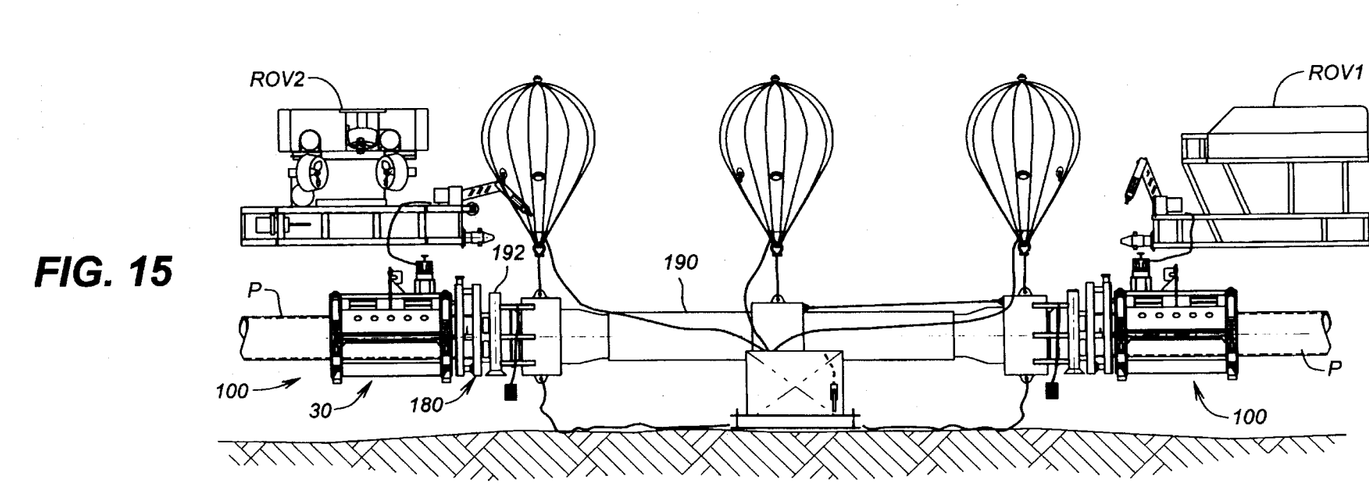
FIG. 15 is a side elevational view of the replacement spool pulled onto the pipe ends.

Referring to FIGS. 13, 14, and 15, after installing the cables 194 from the winches (not shown) between the docking posts 184 and the guide funnels 192, ROV2 moves to the PAR assembly 100 and engages the male docking probe in the female docking cone. As shown in FIG. 13, the stroking cylinders 120 are fully extended on the PAR assembly 100 using hydraulic power from ROV2. Similarly, the stroking cylinders 120 of the second PAR assembly 100 are fully extended by ROV1. ROV1 and ROV2 are disengaged from the PAR assemblies 60. ROV1 and ROV2 are moved to a suitable position for observation of the docking of the replacement spool 190 onto the docking module 180. Four winches are operated simultaneously to haul in the spool 190. The four winches are powered by hydraulic power from ROV1 and ROV2. The spool 190 is hauled in until the spool guide funnels 192 are approximately 500 millimeters above the docking posts 184. ROV1 and ROV2 visually confirm the horizontal separation between the guide funnels 192 and the docking posts 184. If required, the stroking cylinders 120 of the PAR assemblies 100 may be retracted until visual confirmation is obtained that the docking module 180 has moved the required amount. As shown in FIG. 14, the winches are activated to haul in the guide funnels 192 onto the docking posts 184. Once the docking posts 184 are engaged in the guide funnels 192, the rigging is released.

Referring to FIG. 14, the spool 190 is hauled all the way on the docking modules 180. As shown in FIG. 15, the stroking cylinders 120 are retracted on the PAR assemblies 100 until the spool 190 and the pipe end are fully engaged.

The ROV completes the sealing of the spool 190 to the pipe ends. The pipeline P is now repaired and testing is done on the sealing of the spool connection to the pipeline P. Once testing is completed, the equipment is returned to the surface.

In summary, the present invention is a pipe attachment and receiving assembly 100 having modular components to perform subsea pipe severing and handling operations in subsea pipeline repairs. The pipe attachment and receiving assembly 100 includes a chassis assembly 30 which grippingly engages the subsea pipeline P and an extendible interface assembly 110 for releasably mounting the modular components thereto. The modular components include a cutting module assembly 150 which can sever a pipeline P at a nominal distance above the seabed and a docking module assembly 180 to align and manipulate a replacement spool 190 to be installed between the severed ends of the subsea pipeline P.

The foregoing disclosure and description of the invention are illustrative and explanatory thereof, and various changes in the size, shape, and materials, as well as in the details of the illustrated construction, may be made without departing from the spirit of the invention.

We claim:

1. An apparatus for severing and handling a length of a subsea pipe laid on a seabed, comprising:

a chassis adapted to be lowered to the subsea pipe and mounted onto the subsea pipe at or near the seabed, said chassis having a first end and a second end;

means for clamping said chassis to the subsea pipe;

an interface assembly extendibly connected to said chassis at said first end of said chassis, said interface assembly capable of being positioned at various distances from said chassis along the length of the subsea pipe; and a cutting module adapted to be releasably mounted to said interface assembly.

2. The apparatus of claim 1, wherein said chassis comprises:

a first pair of leg assemblies at said first end of said chassis; and a second pair of leg assemblies at said second end of said chassis, wherein said first and second pairs of leg assemblies are adapted to straddle the subsea pipe.

3. The apparatus of claim 2, wherein said means for clamping said chassis to the subsea pipe comprises at each of said first and second pairs of leg assemblies:

a pair of arms pivotally mounted to said pair of leg assemblies, each said arm having an upper end and a lower end, said lower end of said arm adapted to grippingly engage the subsea pipeline; and a pair of hydraulic cylinders each having a first end and a second end, each said hydraulic cylinder is mounted at said first end to said leg assembly and at said second end to said upper end of said arm.

4. The apparatus of claim 1, wherein said interface assembly further comprises means for releasably mounting said cutting module to said interface assembly, wherein said releasably mounting means are adapted for remote diverless operation.

5. The apparatus of claim 4, wherein said cutting module comprises:

a plate assembly; and mounting members attached to said plate assembly for connection to said interface assembly, said mounting members adapted to be received by said releasably mounting means and the position of said plate assembly along the length of the subsea pipe is capable of being altered relative to said chassis.

6. An apparatus for severing and handling a subsea pipe laid on a seabed, comprising:

a chassis adapted to be lowered to the subsea pipe and mounted onto the subsea pipe at or near the seabed;

means for clamping said chassis to the subsea pipe;

an interface assembly connected to said chassis;

means for extending and retracting said interface assembly relative to said chassis; and a cutting module adapted to be releasably mounted to said interface assembly.

7. The apparatus of claim 6, wherein said means for extending and retracting includes a plurality of interface hydraulic cylinders mounted to said chassis, each of said interface hydraulic cylinders having a movably extending ram which is connected to said interface assembly.

8. The apparatus of claim 7, wherein said chassis has a first end and a second end, said chassis comprising:

a first pair of leg assemblies at said first end of said chassis; and a second pair of leg assemblies at said second end of said chassis, wherein said first and second pairs of leg assemblies are adapted to straddle the subsea pipe.

9. The apparatus of claim 8, wherein said means for clamping comprises at each of said first and second pairs of leg assemblies:

a pair of arms pivotally mounted to said pair of leg assemblies, each said arm having an upper end and a lower end, said lower end of said arm adapted to grippingly engage the subsea pipeline; and a pair of hydraulic cylinders each having a first end and a second end, each said hydraulic cylinder is mounted at said first end to said leg assembly and at said second end to said upper end of said arm.

10. The apparatus of claim 6, wherein said interface assembly further comprises means for releasably mounting said cutting module to said interface assembly, wherein said releasably mounting means are adapted for remote diverless operation.

11. The apparatus of claim 10, wherein said cutting module comprises:

a plate assembly; and mounting members attached to said plate assembly for connection to said interface assembly, said mounting members adapted to be received by said releasably mounting means and the position of said plate assembly along the length of the subsea pipe is capable of being altered relative to said chassis.

12. The apparatus of claim 9, wherein said lower end of each said arm includes an arcuate end surface substantially corresponding to the outer surface of the subsea pipe.

13. The apparatus of claim 12, wherein each said arm includes a removable pipe pad at said lower end of said arm, said removable pipe pad including said arcuate end surface and being removable from said upper end of said arm, wherein said arcuate end surface is in substantial gripping contact with the outer surface of the subsea pipe when said chassis is securely mounted on the subsea pipe.

14. The apparatus of claim 3, wherein said lower end of each said arm includes an arcuate end surface substantially corresponding to the outer surface of the subsea pipe.

15. The apparatus of claim 14, wherein each said arm includes a removable pipe pad at said lower end of said arm, said removable pipe pad including said arcuate end surface and being removable from said upper end of said arm, wherein said arcuate end surface is in substantial gripping contact with the outer surface of the subsea pipe when said chassis is securely mounted on the subsea pipe.

* * * * *